United States Patent [19]

Ostertag

[11] Patent Number: 4,822,491
[45] Date of Patent: * Apr. 18, 1989

[54] PROCESS FOR TRANSPORTING METAL IONS BY MEANS OF MICROPOROUS MEMBRANES

[75] Inventor: Karl Ostertag, Erlenbach, Fed. Rep. of Germany

[73] Assignee: Akzo NV, Netherlands

[*] Notice: The portion of the term of this patent subsequent to Apr. 11, 2006 has been disclaimed.

[21] Appl. No.: 790,967

[22] Filed: Oct. 24, 1985

[30] Foreign Application Priority Data

Oct. 25, 1984 [DE] Fed. Rep. of Germany ....... 3439079

[51] Int. Cl.$^4$ ..................... B01D 11/03; B01D 13/01
[52] U.S. Cl. .................................... 210/638; 210/641; 75/101 BE
[58] Field of Search ............... 210/634, 638, 641, 644, 210/649, 648, 805, 806; 75/101 BE, 117; 423/24, DIG. 14

[56] References Cited

U.S. PATENT DOCUMENTS

| | | | |
|---|---|---|---|
| 3,244,763 | 4/1966 | Cahn | 260/677 |
| 3,939,203 | 2/1976 | Mattison et al. | 260/566 A |
| 3,956,112 | 5/1976 | Lee et al. | 210/22 C |
| 3,957,504 | 5/1976 | Ho et al. | 75/101 BE |
| 4,051,230 | 9/1977 | Miyauchi | 423/658.5 |
| 4,125,461 | 11/1978 | Li | 210/22 |
| 4,247,498 | 1/1981 | Castro | 264/41 |
| 4,519,909 | 5/1985 | Castro | 210/500.2 |
| 4,551,252 | 11/1985 | Boyadjiev | 210/638 |

FOREIGN PATENT DOCUMENTS

7505875 11/1976 Netherlands .
2047564 12/1980 United Kingdom .

OTHER PUBLICATIONS

"Solvent Extraction Stars in Making Ultrapure Copper", H. J. McGarr, Chemical Engineering 1970, p. 82ff.

"The Influence of Macrocyclic, Ligand Structure on Carrier-Facilitated Cation Transport Rates and Selectivities Through Liquid Membranes", Journal of Membrane Science 9 (1981), pp. 83ff, J. D. Lamb et al.

"Coupled Transport Membranes" R. W. Baker et al., Journal of Membrane Science 2 (1977), pp. 213ff.

K. J. Murray et al., "How to Select Organic Carriers for Optimum Copper Recoveries" E/MJ, Jul. (1973, pp. 74–77).

Dr. Otto-Albrecht Neumuller, Rompps Chemie-Lexikon (1983).

Journal of Membrane Sci., 21 (1984) pp. 5–19.

Primary Examiner—Ivars Cintins
Attorney, Agent, or Firm—Parkhurst, Oliff & Berridge

[57] ABSTRACT

A continuous high flow rate process for the transport of metal ions from a first aqueous liquid to a nonaqueous, water-immiscible liquid and therefrom to a second aqueous liquid. The nonaqueous liquid contains one or more complexing agents and is kept separated from the metal-ion-transferring aqueous liquid by one or more microporous hydrophobic membranes. A portion of the nonaqueous liquid is found in the pores of these membranes. The bulk of the nonaqueous liquid, however, is circulated through two or more transport zones. The transport of the metal ions to the second aqueous liquid occurs by mechanically mixing the nonaqueous liquid with the second aqueous liquid to form a mixture having an aqueous phase. The aqueous phase is separated from the mixture by means of an isolation process using membranes. The present process is well suited for processes involving the coupled co-transport and countertransport of metal ions and can be used advantageously in ore dressing and wastewater treatment. Costly separation and purification processes are avoided.

38 Claims, 1 Drawing Sheet

PROCESS FOR TRANSPORTING METAL IONS BY MEANS OF MICROPOROUS MEMBRANES

BACKGROUND OF THE INVENTION

The invention relates to a process for the transport of metal ions from an aqueous liquid A (herein liquid A) to a nonaqueous liquid B (herein liquid B) and from the nonaqueous liquid B to an aqueous liquid Z (herein liquid Z) wherein, in a first transport zone, B receives the metal ions from A and is then passed to a second transport zone where it transfers the metal ions to Z. Furthermore, the liquid B is substantially immiscible with the liquids A and Z and contains at least one complexing agent for the metal ions and constitutes a solvent for the complexed metal ions.

Processes in which metal ions are to be removed from one aqueous solution to another aqueous solution are, for example, used in ore dressing. In this case, it is frequently desirable to selectively transfer ions of a certain type from an aqueous liquid and to obtain the pure metal therefrom. Another field of application for these processes is wastewater treatment, where metal ions are to be removed from aqueous liquids such that only a few traces of the metal ions remain.

Processes are known involving the formation of a complex for the transport of metal ions from one aqueous solution to another. West German Laid-open Application No. 29,10,793, for example, describes a process in which an organic liquid containing a complexing agent is present in the pores of a membrane. Each surface of the membrane is in contact with the aqueous liquid transferring metal ions and with that accepting the same. Thus, the transport of metal ions is carried out by complexation at a membrane surface, diffusion of the complexes through the pore system, and release of the ions at the other membrane surface. The disadvantage of this type of process is that the complexing agent can escape from the pore system and enter the aqueous liquids. This can be caused by a certain solubility of the complexing agent in water or by pressure variations or turbulences in the aqueous liquids on the membrane surfaces. Initially, these losses of complexing agents lead to the slowing down of the process, i.e., to a decrease in flow of metal ions and, finally, to a suspension of the process. Before reuse, the membranes must be cleaned and refilled.

The problem described above is obviated in other processes by not using a complexing agent that is fixed in membrane pores. Rather, the organic liquid containing the complexing agent is passed from a first to a second transport zone. In the first transport zone, the metal ions are received by the complexing agent from an aqueous liquid and in the second transport zone they are transferred to another aqueous liquid. Such processes, operating according to the principles of extraction and separation of liquid systems by isolation, have been described in Chemical Engineering 1970, p. 82ff and in U.S. Pat. No. 3,939,203. These processes, too, have disadvantages. Undesirable admixtures can enter the organic liquid from the metal-ion-transferring aqueous liquid during the time when the two are thoroughly mixed. These admixtures must then be removed before recovery of the pure metal by purification operations. Another disadvantage is that during the mixing of the aqueous with the organic liquid, the metal ions, following the distribution law or the chemical equilibrium law, are distributed among the two liquids so that several mixing and separation steps are necessary to obtain high metal yields. As a rule, if these processes are applied to wastewater treatment, another disadvantage is recognized. Since wastewaters frequently contain surfactants, emulsification of the organic liquid or a portion thereof may occur, thus making it more difficult to isolate it from the aqueous phase.

As a consequence, processes in which both the metal-ion-transferring and the metal-ion-receiving aqueous liquids are each combined with the organic phase, then separated again therefrom in the usual manner, e.g., by isolation, often require a series of repetitive steps and are therefore costly.

SUMMARY OF THE INVENTION

Therefore, the novel process was developed with the object of providing a method which does not have the above disadvantages and which especially represent a more economic alternative to prior art process.

The solution to the problem according to the present invention comprises circulating the liquid B containing the complexing agent(s) continuously through the transport zones, during which time the metal-ion-transferring liquid A is kept separated from the circulated liquid B by using one or more microporous hydrophobic membranes, the pores of which contain a portion of the liquid B, mixing in the second transport zone the liquid B by mechanical means with the metal-ion-receiving liquid Z and separating the aqueous phase from said mixture in the second transport zone by a membrane-separation process.

DETAILED DESCRIPTION OF THE INVENTION

Figure 1:
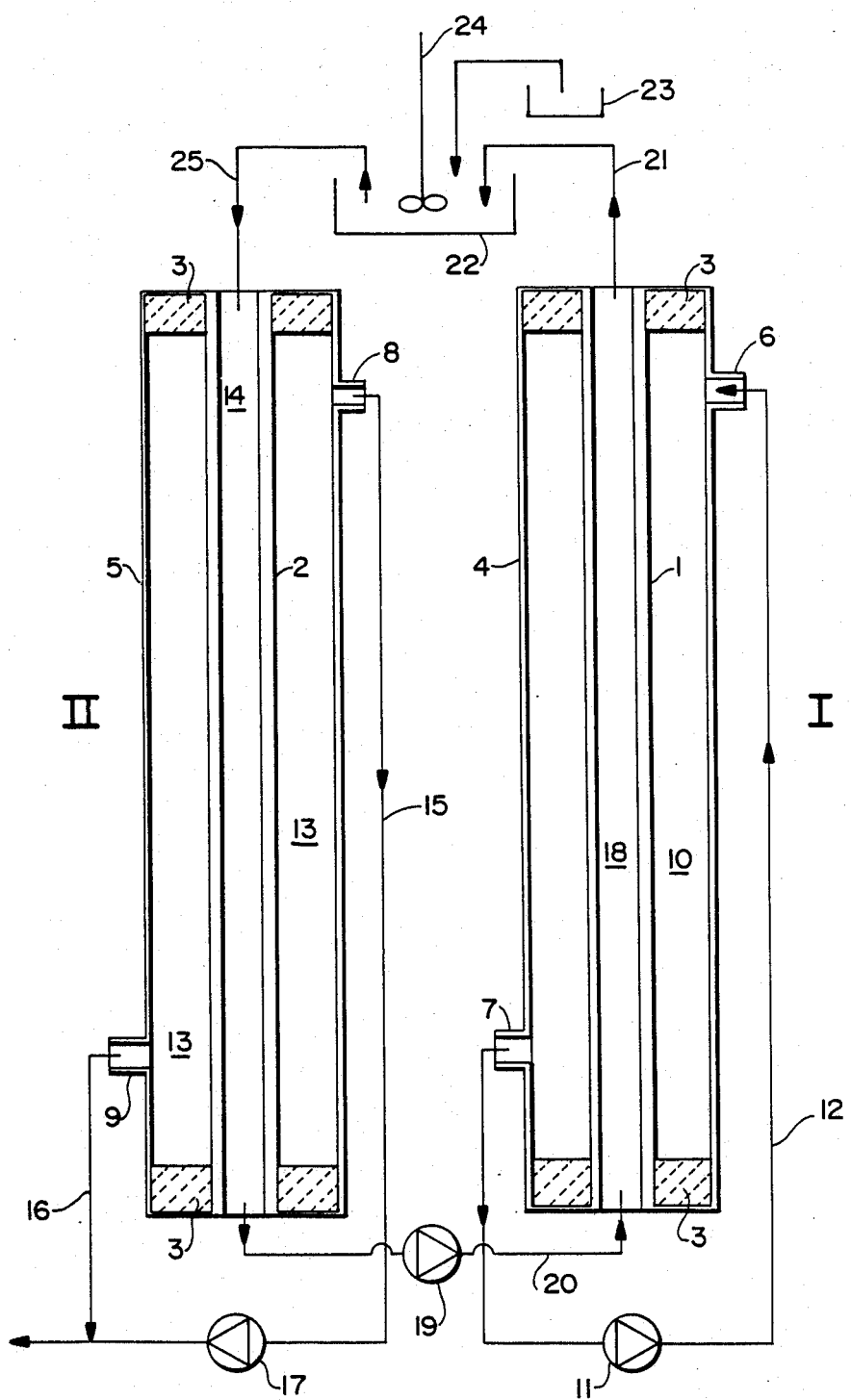

As discussed in greater detail below, the separation of the aqueous phase from the mixture can be carried out in accordance with the selected membrane by not allowing either the liquid Z or the liquid B to permeate through the membranes.

It was found that in this process a flow of metal ions, i.e., the quantity of metal ions transported from liquid B to liquid Z per unit time, is obtained which is greater than in processes operating without mixing the liquids B and Z directly, e.g., processes in which the transport of metal ions from liquid B to liquid Z via diffusion is effected through a membrane. This is accounted for by the substantially larger interface between liquid B and liquid Z, which can be achieved by intimate mechanical mixing of these liquids. Mechanical mixing of these liquids, which are immiscible in the idle state, is therefore necessary to achieve a greater flow of metal ions. The mechanical mixing must be followed by a separation process through which the aqueous phase is isolated from the mixture and which now yields the liquid Z enriched with metal ions. In the novel process of the present invention, this separation process is carried out by the use of membranes.

Advantageously, the process of the present invention can be used in ore dressing and in wastewater treatment. In addition, it is also well suited for a coupled co-transport of metal cations as well as for a coupled counter-transport. In the coupled co-transport, anions are transported concurrently and in the same direction as the cations. In the counter-transport, the necessary maintenance of electrical neutrality in the aqueous liquids occurs by transporting cations of a different type in a direction opposite to the transport of the metal cations.

The process is modified form is also suitable for the transport of metal-containing anions.

The process will now be described in detail. The liquid A containing the metal ions to be transported is in a first transport zone, in contact with one of the surfaces of one or more microporous hydrophobic membranes. On the other surface of the membrane(s), a liquid B is conducted past the corresponding surface of the membrane or membranes, either in pure form or as a mixture with a portion of a liquid Z, as well be described in greater detail below. As a rule, liquid B is a nonpolar or low-polarity organic liquid containing at least one complexing agent for the metal ions. If several types of metal ions are to be transported concurrently, liquid B may also contain several complexing agents. A portion of the total amount of liquid B is found in the pores of the membranes. The transport of metal ions from liquid A to liquid B thus occurs on the membrane surface facing liquid A.

The metal ions are bound in complexes and are transferred to liquid B by virtue of a concentration gradient and the complexation equilibrium. The complexes diffuse through liquid B present in the pores of the membrane by virtue of the concentration gradients. In order to assure that the diffusion occurs at an acceptable rate liquid B must be a solvent for the complexed metal ions. On the other membrane surface, the complexes are carried by the circulated portion of liquid B and are brought to a second transport zone. In the embodiment of the process in which pure liquid B is used, in order to receive metal ions from liquid A, the metal ions in the second transport zone are set free from their complexes and transferred to a liquid Z. If a mixture of liquids B and Z is present in the first transport zone, the transition of the metal ions from liquids B to Z occurs at least in part even before the entry of the mixture into the second transport zone. Membranes that are absolutely essential in the first transfer zone are dispensed with in the second transport zone. This is possible because liquid B contains no undesirable admixtures. On the other hand, liquid A may contain such admixtures either in dissolved or dispersed form. Admixtures dispersed in liquid A do not get to liquid B found in the micropores of the membrane because of their particle size or their polarity. Admixtures dissolved in liquid A do not enter into the pores of the hydrophobic membranes and hence into liquid B because of their polarity.

After liquid B or the mixture of liquids B and Z has left the second transport zone, it can again be returned directly to the first transport zone to receive metal ions again. However, in the cycle of liquid B, there may be an even number of additional transport zones. In this way, liquid B or the mixture of liquids B and Z can alternately receive in one zone metal ions from liquid A and transfer them to liquid Z in the next zone, and vice versa. In a preferred embodiment of the process the liquid B is circulated through more than two transport zones, the total number thereof being an even number with liquid B alternately receiving in one zone metal ions from liquid A and transferring them in the next zone to liquid Z, and vice versa. Liquid B is combined with liquid Z in this embodiment as well, and the aqueous phase is thereafter kept separated from the mixture by a membrane-separation process. The advantages that can thus be achieved, i.e., a greater amount of transported metal ions per unit time, can in principle be attained to a certain extent even when only two transport zones are used, e.g., by larger dimensioning or using a greater number of hollow-filament membranes by means of which the liquid A is kept separated from the liquid B. However, in contrast thereto, the use of more than two transport zones offers the advantage that commercially available equipment can be used, while specially designed equipment may be necessary with larger dimensionings. Moreover, a larger dimensioning versus lengthening of the membranes is meaningful only to a certain degree, if one of the advantages of the process is not to be diminished. This advantage relates to the high concentration gradients of the metal ions between liquids A and B, since liquid B enters the first transport zone charged with few metal ions and is enriched with metal ions only along the membrane. With larger dimensioning of the equipment, liquid B can be heavily enriched with metal ions and therefore the flow values, i.e., the amount of metal ions transported from liquid A to liquid B per unit time, can be lower due to dropping concentration gradients than if more than two exchange devices with smaller dimensions are used. In the latter case, liquid B transfers the metal ions to liquid Z before it is recharged. With the use of more than two transport zones, each second zone can be fed from a common reservoir of liquid A. At any one time, liquid A is kept separated from liquid B in the corresponding transport zones by microporous hydrophobic membranes.

In addition to the embodiment of the process described above, in which liquid B alternately receives metal ions from liquid A and transfers them to liquid Z, a serial connection of transport zones is also possible. For example, this embodiment comprises the liquid B receiving metal ions from liquid A in several series-connected transport zones before transferring the metal ions to liquid Z.

In order to obtain high concentration gradients between the liquids A and B, a preferred embodiment of the process comprises circulating liquid A in a direction opposite to the flow of liquid B on the membrane surfaces. However, liquid A may also be stationary.

In order to maintain the electrical neutrality in liquid B, one can, for example, transport anions with the metal cations concurrently and in the same direction. This embodiment of the process is known as coupled co-transport. Suitable complexing agents for this modification are, for example, crown ethers as described in the Journal of Membrane Science 9 (1981), pp. 83ff, since crown ethers can also carry anions. Crown ethers are cyclic compounds with only carbon and oxygen atoms in the ring, with ether bonds being present in the ring and in which there are at least two carbon atoms found between every two oxygen atoms. However, the crown ethers are also well suited for the process of the coupled counter-transport described below. Their use constitutes a preferred embodiment of the process. In addition to use of the unsubstituted crown ethers, derivatives of crown ethers and substituent-carrying crown ethers are also suitable.

An especially preferred embodiment of the process comprises maintaining the electrical neutrality in the aqueous liquids by carrying out a so-called coupled counter-transport in which cations X, which are not identical to the metal ions, are transported in the opposite direction. This process offers the advantage that complexing agents can also be used that are unsuitable for transporting anions but, for example, are desirable for many metal ions because of their selectivity. Especially suitable complexing agents of this type are chelating hydroxyoximes as described in the Journal of Membrane Science 2 (1977) pp. 213ff. Thus, a preferred embodiment of the process lies in the use of chelating hydroxyoximes as the complexing agents in the process modifications of the coupled counter-transport. Other suitable complexing agents are organic phosphoric acid derivatives such as phosphoric acid bis (2-ethylhexyl) esters and organic phosphine oxides, e.g., trioctylphosphine oxides, as well as amines, e.g., trioctylamine.

Coupled counter-transport processes have the great advantage that metal ions can be transported against their concentration gradients. This means that transport of metal ions from liquid A via liquid B to liquid Z is possible, even if the metal-ion concentration in liquid Z is already greater than in liquid A. This is made possible if the concentration gradient of the cations X is still greater and produces the driving force. In this case, the process continues as long as $X_Z/X_A$ is greater than $(M_Z/M_A)^{(n_X/n_M)}$,* where $X_A$ and $X_Z$ are the concentrations of the cations X in the liquids A or Z, $M_A$ and $M_Z$ the corresponding concentrations of the metal ions and $n_M$ and $n_X$ the valences of the metal ions or of the cations X. The cations M are preferably hydrogen atoms. In that case, the above condition signifies that liquid Z must be more acidic than liquid A. Generally, the pH of liquid Z ranges from 0.5 to 1.5 and that of A from 2.5 to 6. To hold this condition for a relatively long time, it is advisable to maintain a substantially constant pH in liquid A by neutralizing the transported ions by adding a buffer, for example.
*$(M_Z/M_A)^{(n_X/n_M)} = (M_Z/M_A) \exp (n_X/n_M)$ In a preferred embodiment of the process, coupled with the transport of the metal ions, a transport of cations X that are not identical to the metal ions is effected in a direction opposite to the transport of the metal ions, with the cations X also being present as dissolved complexes in the liquid B. In this case, the cations X must be present in the liquid B as dissolved complexes, so that they can be transported rapidly from the liquid Z to the liquid A. The complexing agent(s) present in the liquid B must also form complexes with the cations X, and B must be a solvent for the complexed cations X as well.

For the coupled counter-transport, it is also preferable that the concentrations $X_Z$ of X in liquid Z be greater than the concentration $X_A$ of X in liquid a and that at least at the start of the process, $X_Z/X_A$ be greater than $(M_Z/M_A)^{(n_X/n_M)}$, $M_A$ and $M_Z$ being the concentrations of the metal ions in the liquids A or Z and $n_M$ and $n_X$ being the valences of the metal ions and of the cations X.

Another preferred embodiment is one where $M_Z$ is greater than $M_A$. Other preferred embodiments are those in which the cations X are hydrogen ions, and in this case a substantially constant pH is maintained in liquid A by neutralizing the transported hydrogen ions.

Microporous hydrophobic membranes are used for the process in order to separate liquid A from liquid B. Microporous membranes are membranes with a mean pore diameter of approximately 0.05 μm to 10 μm. The diameter at the narrowest point that must be passed by a particle, if that particle is to get from one membrane surface to the other, is of great importance concerning their suitability for a certain process.

Especially suitable, and therefore preferred among the group of microporous membranes, are those membranes that have a so-called cellular pore system for keeping liquid A separated from liquid B. Inside the membrane there are, in addition to the pores, substantially spherical cells that are connected together by connecting pores. In this case, the cells can have a mean diameter of about 0.5 μm to about 100 μm. The connecting channels constituting the pores determine whether a certain particle can still enter the membrane and they usually have a mean diameter of about 0.05 μm to 10 μm. Membranes with this structure are therefore especially suitable for the process, because they can receive the majority of available complexing agents into the pore system, but not contaminants of relatively larger particle aggregations that are dispersed in the liquid A.

Suitable pore structures of such membranes are, for example, described in West German Laid-open Application No. 27 37 745. The corresponding embodiments of their West German laid-open Application are incorporated herein.

In these membranes structures, based for example, on the presence of the cells, large pore volumes, i.e., pore volumes of 65-85% of the total membrane volume, can be established. Larger pore volumes, i.e., the volumes of the cells and of the connecting pores taken together, make it possible to receive a fairly large amount of liquid B in the pore system and thus to transport a relatively large number of metal ions that can diffuse through the membrane per unit time. In a preferred embodiment of the process, the pore volume of the membranes is 65-85% of the total membrane volume. In another preferred embodiment, the pore volume is 70-80% of the total membrane volume.

The wall thickness of the membranes separating liquid A from liquid B can be selected almost at will, in terms of feasibility of the process. There are, however, lower limits determined by membrane stability requirements. Since the liquids employed exert certain pressures on the membrane, stability factors can determine a lower limit for the wall thickness, in the case of larger pore volumes. On the other hand, since thicker walls can lead to relatively long diffusion paths for the metal-ion complexes, it is expedient to use walls that are not too thick. Therefore, in a preferred embodiment of the process, the membrane wall thickness is about 50 μm to about 400 μm. In another preferred embodiment, the wall thickness is about 50 μm to 300 μm.

The membranes that keep liquid A separated from liquid B are hydrophobic. This means that the inner surface of the membranes formed by the surfaces of the pores or cells and of the connecting pores must be hydrophobic. This can be achieved by using either a hydrophobic material for the entire membrane or membranes with a hydrophobic inner surface. For example, the latter may be the case when using a hydrophobing layer. On one hand, the hydrophobicity ensures, that liquid B, which is nonpolar or exhibits low polarity and sufficiently immiscible with water, easily enters the membrane pores, since hydrophobic membranes are readily wetted by nonpolar liquids. On the other hand, the hydrophobicity of the membrane material prevents water or the liquid A from entering, since aqueous liquids exhibit much higher wetting pressures for these materials than nonpolar organic liquids, such as liquid B. The wetting pressure is the pressure that a liquid must at least exhibit in order to enable it to enter the pore system of a membrane. In the case of water, the wetting pressure for hydrophobic polypropylene is about 2.5 to 3 bar, if the connecting pores have a diameter of about 0.4 μm at the narrowest point. These values are based on the following method for determining the wetting pressure: A hollow filament with a wall thickness of about 100–200 μm is fabricated from the membrane material to be analyzed. The pore structure of the hollow filament should correspond somewhat to that of the membrane to be used later. The lumen of the cleaned and dried hollow filament is filled with the liquid to be analyzed, the pressure of which is slowly increased as a result. The wetting pressure is the pressure at which the first drop of liquid flows from the outer surface of the hollow filament, which can be easily determined by visual means. Since in the process the liquid A has a pressure below the wetting pressure it exhibits for the hydrophobic membranes, entry of water as well as polar admixtures dissolved therein, into the membrane that keeps liquid A separate from liquid B is prevented. Only the metal ions going into solution in liquid B by complex formation can enter the pore system.

Hydrophobic membranes suitable for keeping liquid A separated from liquid B, comprise materials selected from polyolefins and halogenated polyolefins. Membranes of polypropylene such as Accurel ® (Enka AG, Wuppertal) or of polyvinylidene fluoride (PVDF), for example, have proven to be especially suitable. The use of membranes of polypropylene or PVDF represent preferred embodiments of the process.

The hydrophobicity of these membranes alone would not be sufficient to prevent water or polar admixtures dissolved in the liquid A from entering the membrane, if this entry were to occur through mixing with liquid B. Therefore, the liquid B must be sufficiently immiscible with the liquid A. This means that the solubility of B in A, as well as the solubility of A in B must not be greater than about 0.5 to 1.0 g/liter.

Microporous hydrophobic materials in the form of flat or spiral membranes can be used for the membranes which separate liquid A from liquid B. However, membranes in the form of hollow filaments or tubes have proven especially suitable, since they have large surfaces with a relatively low volume. Therefore, a preferred embodiment of the process uses membranes in the form of hollow filaments or tubes. Another preferred embodiment of the process comprises vertically arranged membranes wherein liquid B is conducted from top to bottom past the surfaces of the membranes, parallel to the surfaces. In this embodiment, liquid B can be conducted outside past the membranes or through the lumina thereof. The resultant pressure drop along the hollow filaments or tubes, due to the flow of liquid B from top to bottom, is compensated for by the hydrostatic pressure associated therewith. This compensation for pressure drop, which would otherwise occur, leads to an equalization of metal-ion transport along the length of the membrane.

Liquid B may comprise one or more complexing agents without further additives. In a preferred embodiment of the process, however, liquid B is a solution of one or more complexing agents in a nonpolar solvent or mixture of solvents. Since the diffusion rate of the metal-ion complexes in the pore system depends on the viscosity of liquid B, addition of a low-viscosity solvent is frequently advantageous.

After the circulated liquid B has received the metal ions from liquid A and now has them bound in a complex, it is passed on to the second transport zone. Here, liquid B is mixed mechanically with liquid Z. The metal ions are thereby released from their complexes and transferred to liquid Z. For the subsequent separation of liquid Z enriched with metal ions to be economically feasible, liquid B must be sufficiently immiscible with liquid Z. This means that the solubility of liquid B in liquid Z and liquid Z in liquid B must not be greater than about 0.5 to 1.0 g/liter.

To create a large interface or exchange surface between liquids B and Z, mechanical mixing is necessary because of the immiscibility of the liquids in the idle state. This can be effected by a conventional agitation process. Normally, the duration of this mixing can be relatively short and is determined from case to case by the volumes of the liquids and by other parameters such as, for example, chemical reaction parameters. The duration of mixing may be shortened by mixing or stirring at an elevated temperature.

After mixing the liquids B and Z, the latter will be enriched with metal ions. To recover the ions, the aqueous phase is again separated from the mixture. This segregated aqueous phase is identical in qualitative composition to the original liquid Z. It differs from the original liquid Z only in that it has a higher metal-ion content and, in the case of coupled counter-transport, by a lower content of cations X, e.g. hydrogen ions. As will be discussed in greater detail below, the membrane-separation process can be effected such that liquid B is completely separated from liquid Z, so that after separation a practically pure organic phase B and a practically pure aqueous phase Z with a higher metal-ion content are obtained. However, in one embodiment of the process, they can also be incompletely separated. In this modification, only a portion of the pure phase Z enriched with metal ions is separated from the mixture of liquids B and Z, with the other constituents obtained by this separation process still constituting a mixture of liquids B and Z. Thus, this mixture differs from that obtained by the mixing process in that it contains a lower amount of aqueous phase. Therefore, in this case instead of the pure liquid B, a mixture of liquids B and Z is returned to the first transport zone, where this mixture again receives metal ions from the portion of liquid B found in the pores of the membranes of this transport zone. Subsequently, the mixture is again subjected to mechanical mixing, then to the separation process to separate the portion of the liquid Z enriched with metal ions. The decrease in the content of liquid Z occurring in this modification can be compensated continuously or intermittently. This is, for example, accomplished by adding during the mixing a quantity of liquid Z still to be enriched with metal ions, which thus has the original composition of liquid Z. In a special case, however, this can also be done in batches, i.e., without the addition of liquid Z to the mixture, in which case liquid B and liquid Z can be totally separated from one another after recycling the mixture several times.

The embodiment for the incomplete separation of the mixture described above is a modification of the process. Since in each pass of the separation process only portions of liquid Z are separated, in a continuous process the separation procedure can be shortened in relation to the total separation process. In addition, less liquid Z must be mixed in the mechanical-mixing step, so that this step too can be shortened.

The embodiment of the process for carrying out the incomplete separation described above can be effected whenever the membranes used for the separation process are permeable to liquid Z with the metal ions dissolved therein, but are not permeable to unpolar organic liquids under the process conditions. Therefore, membranes with an inner hydrophilic surface, which will be described below, are used for this embodiment of the process.

The above described membranes with an inner hydrophilic surface are also suitable for the embodiments of the process for completely separating liquids B and Z. However, membranes with an inner hydrophobic surface can also be used for this embodiment. The embodiment of the process for total separation comprises the repeated total separation of liquids B and Z by means of membranes after the liquids have been mixed. In this case, the pure liquid B is again returned to the first transport zone to receive metal ions. This is followed by a mixing with liquid Z.

If membranes with an inner hydrophobic surface are used for the separation process, the membrane is permeable to liquid B, but not to the liquid Z enriched with metal ions. In this case, liquid B therefore permeates through the membrane and is recycled. This embodiment of the process, which can be designated as the total separation method, can be effected such that the liquids B and Z are almost totally separated from each other, so that almost all of liquid B permeates through the membrane and an almost all pure liquid Z is obtained. However, this is less economical because of the time expended. Normally, one is content with removing only the bulk of liquid B from the mixture by using the hydrophobic membrane and to recirculate the same, so that the aqueous phase separated from the mixture still contains organic admixtures which, if necessary, can be removed by subsequent purification, and likewise, can be recirculated. Despite the fact that the aqueous phase may still contain organic admixtures, the designation "total separation" is retained for this method as well. This is for the purpose of differentiating it from the "incomplete separation" variant described above in which a mixture of the liquids B and Z is circulated and in which the membrane is permeable to the aqueous phase.

The two forms of membrane structure possible, i.e., with an inner hydrophobic or hydrophilic surface, will now be described in detail.

Inner surface in this context means the zones of the membrane with which the liquid permeating through the membrane comes into contact. Accordingly, in the case of the microporous membranes described above in which defined pores and perhaps cells are present, these are the surfaces of the pores and cells. By contrast, in the case of membranes discussed below, which no longer have any openings or pores in the real sense, one can no longer speak of a surface of the pores. Here, the characteristic of this "inner surface" is determined by the material used for fabricating the membranes.

Membranes that are suitable for the process with an inner hydrophobic surface are microporous hydrophobic membranes like those used in the first transport zone to keep liquid A separated from liquid B in the zone.

The embodiments described above and preferred for this purpose are also preferred for the separation of the mixture of liquids B and Z when using membranes with an inner hydrophobic surface. Particularly preferred membrane materials are again polypropylene and polyvinylidene fluoride (PVDF). As mentioned earlier, total separation of liquid B from liquid Z occurs when these hydrophobic membranes are used. In this case, liquid B permeates through the membranes, whereas liquid Z does not enter the membrane because of the high wetting pressure of aqueous liquids in relation to hydrophobic membranes.

If membranes with an inner hydrophilic surface are to be used through which liquid Z permeates, microporous membranes of hydrophobic polymers likewise can be used as described above. In this case, before using these membranes, it is only necessary to hydrophilize their inner surface. This hydrophilization can for example occur by impregnation with a solution of a hydrophilic material. An especially simple method is to saturate a microporous hydrophobic membrane, e.g., of polypropylene with an organic water-miscible liquid, e.g., ethanol, which readily wets the membrane material, then bringing it into contact with water. The penetration of water into the pore system is likewise possible at normal pressure due to the miscibility of ethanol and water. Ethanol can be expelled from the pores by subsequent rinsing with water. A membrane thus treated, which is previously wetted with water, enables additional amounts of water to enter without the need for overcoming a high wetting pressure, as in the case of a dry hydrophobic membrane. Accordingly, membranes thus treated are likewise designated as membranes with an inner hydrophilic surface in accordance with the principles set forth in the present application.

Another form of construction of membranes with an inner hydrophilic surface is that represented by membranes comprising a hydrophilic material. In this case, hydrophilization is of course no longer necessary. Membrane materials suitable therefor are, for example, regenerated cellulose, polysulfone, or an organic polymer to which ionic groups are bound, such as polystyrene, which is substituted by sulfonic acid groups or by organic ammonium groups. Membranes of these materials are preferred for the process.

In another preferred embodiment using hydrophilic membranes, the maximum diameter of pore passages on the outer surface and within the membranes is 100 nm. When using hydrophilic membranes, the permeation of the organic liquid B must be stopped. In this case both the nature of the membrane material and its structure contribute toward satisfying this requirement.

Maintaining the above upper limit of 100 nm as the maximum value for the pore-passage diameter ensures that each pore passage has a diameter of not more than 100 nm at its narrowest point and that there are no openings or pores with a larger diameter on the surface of the membrane.

The maximum diameter of a pore at its narrowest point inside the membrane can be determined by the use of the bubble-point method known from the prior art. Optical methods, such as electron microscopy, are suitable for determining the diameter of pores or openings on the membrane surface.

As with the case of membranes which keep liquid A separated from the liquid B, membranes in the form of hollow filaments or tubes are also preferred for the separation process, since they have a very advantageous surface-to-volume ratio.

If necessary, it can be advantageous to subject liquid Z thus obtained to the separation process again or sending the resulting portions of liquid Z to a further separation process in order to remove any residues of liquid B or portions thereof. In this way, a higher purity of liquid Z enriched with metal ions, from which the pure metals can then be segregated as required, can be achieved thereby. This post-purification is also offered as an additional step in wastewater treatment. This subsequent separation procedure for example, can also be effected with membranes or by means of a conventional separation device. The portions of liquid B thus obtained are appropriately recirculated.

An embodiment of the process is shown schematically in the simplified diagram of FIG. 1. Here, an embodiment is shown in which a membrane having an inner hydrophilic surface is used for the separation process, thus enabling liquid Z to permeate therethrough.

For simple illustration, only one membrane each, in the form of a hollow filament 1 or 2, is shown for the first transport zone I and for the separation-process step II. The hollow filaments are embedded by means of an embedding medium 3 in the housings 4 and 5. This embedding medium 3 can, for example, consist of polyurethane. Connecting pieces 6, 7, 8 and 9 are mounted on the housings 4 and 5 for the intake and discharge of liquids. Liquid A is found in the outer compartment 10 for the hollow filaments of the first transport zone I, said liquid A being circulated via the connected pieces 6 and 7 by means of the pump 11 along the patch denoted by 12.

In the outer compartment 13 for the hollow filaments of the second transport zone II there is provided the liquid Z or portions thereof enriched with metal ions, depending on whether total or incomplete separation is effected according to the embodiment. These portions of Z are derived from the mixture of liquids B and Z passed through the lumen 14 of the hollow filaments. These portions of liquids Z, which have been obtained after separation by means of the membrane, leave the housing 5 via the connecting pieces 8 and/or 9 and follow the path denoted by the lines 15 or 16. They can be fed to a device not shown herein for further purification by means of a pump 17 or for further processing elsewhere.

Depending on whether total or incomplete separation is effected according to the method, the circulated liquid B or the mixture theeof with liquid Z enters the lumina 18 of the hollow filaments of the first transport zone I. In this case, it is conveyed along the path denoted by the line 20 using pump 19.

After leaving the first transport zone, liquid B charged with metal ions or the mixture follows the path indicated by the line 21 and enters a mixing unit 22. Liquid Z is fed from a reservoir 23 to this mixing unit. An agitator 24 is used for intimate mixing. The mixture then follows the path indicated by the line 25 and is delivered by a pump (not shown) to the lumen 14 of the hollow filaments 2 for the separation process.

Additionally, heating devices (not shown) can be mounted on the housings, the mixing unit, and along the liquid lines.

The process of the present invention offers the following advantages over processes known from the prior art:

1. The use of microporous, hydrophobic membranes between the liquids A and B prevents the entry of undesirable admixtures into the liquid B. The metals in B and hence also in the liquid Z as a result, are extremely pure.

2. The use of the above described membranes requires no costly steps for separating liquid A from liquid B, as are necessary in processes using no membranes.

3. Because of the circulation of liquid B, the latter enters the first transport zone where it receives metal ions from liquid A when it has few metal ions. Thus, a high concentration gradient can be maintained between liquids A and B, which results in high rates of flow. This applies even to a greater extent whenever the preferred process is used in which liquid A is passed in a counter-current flow to liquid B.

4. Microporous membranes with a cellular pore structure and large pore volumes, as they are employed preferably to keep liquid A separated from liquid B, can take up a larger quantity of metal ions into the pore system than membranes without cells and with smaller pore volumes. In this way, the flow of metal ions can attain higher values.

5. The losses of complexing agents in the pore system, which can occur due to a certain solubility of the complexing agent in liquid A, are continuously compensated by the circulated liquid B, since liquid B can enter the pores of the microporous hydrophobic membranes in use.

6. The circulation of liquid B enables a farily large number of transport zones to be serially connected, so that a relatively large quantity of metal ions can be transported from liquid A to liquid Z in one and the same system.

7. The intimate mixing of liquids B and Z increases the flow of metal ions in comparison with processes in which this type of mixing does not occur.

8. The separation of the mixture of liquids B and Z by membranes is less expensive than separation operations by segregation, which often must be repeated more than once. Separation by means of membranes enables the entire process to be carried out continuously. The mixture of liquids B and Z or the resulting pure liquid Z obtained after the separation process is recirculated in the first ransport zone.

The invention will now be illustrated by examples.

EXAMPLE 1

An aqueous solution of copper-II-sulfate with a pH of 3.5 serves as aqueous liquid A. Thus, the metal ions to be transported were $Cu^{++}$ ions. The solution pH was maintained substantially constant during the process by addition of an aqueous NaOH solution. 6.6 liters of said aqueous solution A was continuously circulated by pumping at the rate of 250 liters/hour and during this circulation flowed through the lumina of the microporous hydrophobic hollow filaments, which in the first transport zone were used as membranes. The aqueous liquid A circulated by pumping contained 160 ppm Cu during the process. This value was established at the start of the process and kept constant during the process. Constant maintenance of the 6.6 liters and a concentration of 160 ppm was effected, on the one hand, by continuous addition of aqueous solution containing 2,000 ppm Cu and continuous removal of the same volume of aqueous solution with 160 ppm Cu from circulation. To maintain the volume and concentration of the circulated aqueous solution A, continuous addition of 2000 ppm of Cu-containing solution at 880 ml/hour and continuous removal of 160 ppm of Cu-containing solution likewise at 880 ml/hour were necessary in this example.

The circulated aqueous solution entered at the upper end of the vertically arranged hollow-filament membranes into their lumina at a pressure of 1.8 bar and emerged at the lower end of the hollow filaments at a pressure of 1.2 bar. Subsequently, its pressure in the circulation was again raised to 1.8 bar.

Eight-hundred hollow filaments of microporous polypropylene, used as membranes for this first transport zone, were provided in the form of a substance-exchange module. The inside diameter of each hollow filament was 0.3 mm and the outside diameter 0.6 mm, which corresponds to a wall thickness of 150 μm. The maximum pore diameter was 0.57 μm, measured by the bubble-point method, the length of the hollow filaments 216 mm, and the total exchange surface (=inner surface of the hollow filaments) 0.163 m². A mixture of organic liquid B and aqueous liquid Z was circulated from bottom to top in the outer compartment for the hollow filaments parallel to the surfaces of the hollow filaments. This mixture contained 90 weight percent of the organic liquid B and 10 weight percent of the aqueous liquid Z. The circulated volume was 6.6 liters, which was recirculated at 120 liters/hour. Liquid B was a 10 percent by weight solution of "LIX 63/70" (trademark) in kerosene. "LIX 63/70" (trademark) is a mixture of two hydroxyoximes obtainable from Henkel Corp., Kankakee, Ill., USA. Liquid Z, which was conducted past the hollow filaments in a mixture with liquid b, was a sulfuric-acid solution of copper-II-sulfate containing 13,000 ppm Cu with a pH of 0.64.

The circulated mixture of liquids B and Z, after leaving the module of the first transport zone was fed to a tank to which fresh aqueous sulfuric acid with a pH of 0.55 was added continuously at a rate of 100 ml/hour. Mechanical mixing of liquids B and Z occurred in the tank by agitation. The addition and removal of the mixture to or from the tank was continuous.

After mixing, the pressure of the circulated mixture was raised to 2.1 bar. Then, the mixture entered a module containing a flat membrane made of polystyrene (polyelectrolyte membranes Amicon "UM 10" (trademark) from Amicon, with a "pore" radius of 1.5 nm according to manufacture's data modified with ion groups. This module, which represents the second transport zone, served to separate a portion of the aqueous liquid Z from the mixture of liquids B and Z. In the process, liquid Z permeates thriough the hydrophilic membrane. The flat membrane had the form of a disk with a diameter of 76 mm.

The aqueous liquid Z was separated continuously at 100 ml/hour by the separation process carried out according to the cross-flow principle. Thus, due to the addition of aqueous solution to the mixture tank referred to above, the volume of the circulated mixture as well as the ratio of 90% liquid B/10% liquid Z remained constant.

After leaving the second transport zone, the mixture of liquid B and Z was adjusted to a pressure of 1 bar before it was fed back to the first transport zone.

Under these conditions, a flow of $Cu^{++}$ ions between the liquid A and the mixture of liquids B and Z of 15.7 μg/cm². min was obtained. The surface specification cm² referring to the total exchange surface of the hollow propylene filaments.

EXAMPLE 2

The following modifications were made in relation to Example 1:

The fresh aqueous liquid A, which was added to the circulated aqueous liquid A, contained 2,200 ppm Cu. The rate of addition and removal of liquid A from circulation was 875 ml/hour.

The mixture of liquids B and Z contained 65 weight percent liquid B and 35 weight percent liquid Z. The liquid Z provided in the mixture was a sulfuric acid solution with 8,100 ppm Cu and a pH of 0.53. Aqueous sulfuric acid solution was fed to the mixing tank at the rate of 168 ml/hour. In the second transport zone the liquid Z was separated at 168 ml/hour.

The membrane in the second transport zone in which a portion of liquid Z was separated was a flat membrane with a polysulfone base (Amicon "PM 10" (trademark) from Amicon with a "pore" radius of 1.9 mm according to manufacturer's data).

Under these conditions, a value of 17 μg/cm². min was obtained initially for the flow of $Cu^{++}$ ions from liquid A to the mixture of liquids B and Z. This value, however, declined somewhat during the process.

EXAMPLE 3

The following modifications were made in relation to Example 1:

The circulated mixture of liquids B and Z contained 65 weight percent of liquid B and 35 weight percent of liquid Z. The liquid Z present in the mixture contained 16,500 ppm Cu and had a pH of 1.1.

The fresh liquid A, which was added to the circulated liquid A, contained 1880 ppm Cu. This addition was performed at a rate of 1155 ml/hour. The circulated liquid A contained 560 ppm Cu.

The aqueous sulfuric acid solution added to the mixing tank had a pH of 0.69 and was added at a rate of 100.4 ml/hour. Likewise, about 100 ml/hour of aqueous liquid Z was separated in the second transfer zone by means of membranes.

Hollow filaments of microporous polypropylene were used as membranes in the second transfer zone, which served for the separation of aqueous liquid Z from the mixture.

The liner surfaces of the hollow filaments had been previously hydrophilized by the impregnation-with-ethanol method described above. Seven hollow filaments with an inside diameter of 1.8 mm, an outside diameter of 2.6 mm, a pore volume of 75%, and a maximum pore diameter of 0.55 μm were used.

A $Cu^{++}$ ion flow of 16.3 μg/cm². min was obtained.

In all three examples, the separated aqueous liquid Z had a kerosene content of less than 1%.

The principles, preferred embodiments and modes of operation of the present invention have been described in the foregoing specification. The invention which is intended to be protected herein, however, is not to be construed as limited to the particular examples disclosed, since these are to be regarded as illustrative rather than restrictive. Variations and changes may be made by those skilled in the art without departing from the spirit of the invention.

What is claimed is:

1. A process for the transport of metal ions from a first aqueous liquid to a nonaqueous liquid and from the nonaqueous liquid to a second aqueous liquid, wherein the nonaqueous liquid is substantially immiscible with said first and second aqueous liquids and comprises at least one metal complexing agent for forming complexed metal ions when said metal ions contact said metal complexing agent, and further acts as a solvent for the complexed metal ions, comprising:
    keeping the nonaqueous liquid separate from said first aqueous liquid by at least one microporous hydrophobic first membrane comprising pores containing a portion of the nonaqueous liquid;
    transferring metal ions from said first aqueous liquid to the nonaqueous liquid in a first transport zone;

mechanically mixing in a second transport zone the metal containing nonaqueous liquid from the first transport zone and said second aqueous liquid to form a mixture comprising an aqueous phase, thereby transferring the metal ions contained in the nonaqueous liquid to said second aqueous liquid;

continuously circulating the nonaqueous liquid through said first and second transport zones; and separating aqueous phase in the second transport zone from the mixture by at least one second membrane separation.

2. The process of claim 1, further comprising circulating the nonaqueous liquid through at least two sets of two transport zones, wherein in each said set of transport zones the nonaqueous liquid receives metal ions from said first aqueous liquid in one transport zone and transfers them to said second aqueous liquid in the next transport zone, and the nonaqueous liquid in said next transport zone is mixed mechanically with said second aqueous liquid to form a mixture having said aqueous phase and said aqueous phase is separated from said mixture by said second membrane of the membrane-separation process.

3. The process of claim 1, wherein coupled with the transport of the metal ions, cations X which are not identical with the metal ions are transported in a direction opposite to the transport of the metal ions as complexes in the nonaqueous liquid.

4. The process of claim 3, wherein a concentration $(X_Z)$ of X in said second aqueous liquid is greater than the concentration $(X_A)$ of X in said first aqueous liquid and at the start of the process, $X_Z/X_A$ is greater than $(M_Z/M_A)^{(n_X/n_M)}$, where $M_A$ and $M_Z$ are the concentrations of the metal ions in said first and second aqueous liquids respectively and $n_M$ and $n_X$ are the valences of the metal ions and cations X respectively.

5. The process of claim 4, wherein $M_Z$ is greater than $M_A$.

6. The process of claim 3, wherein the cations X are hydrogen ions.

7. The process of claim 6, further comprising maintaining a substantially constant pH in the first aqueous liquid by neutralizing said hydrogen atoms.

8. The process of claim 3, wherein said complexing agents are chelating hydroxyoximes.

9. The process of claim 1, further comprising circulating said first aqueous liquid, wherein said first aqueous liquid is passed to the surfaces of said hydrophobic first membrane in a direction opposite to the flow of said nonaqueous liquid.

10. The process of claim 1, wherein the nonaqueous liquid comprises a solution of one or more complexing agents in a nonpolar solvent or mixture of solvents.

11. The process of claim 1, wherein said complexing agents are crown ethers.

12. The process of claim 1, further comprising replacing the circulated nonaqueous liquid with a mixture of nonaqueous liquid and said second aqueous liquid are wherein during the circulation a portion of the aqueous liquid, enriched with metal ions, is removed continuously or discontinuously for the mixture by said second membranes of the membrane separation process, and wherein said separation of a portion of said second aqueous liquid is totally or partially compensated by the addition of said second aqueous liquid not enriched with metal ions.

13. The process of claim 1, further comprising separating the portion of said aqueous liquid obtained by the separation process from any remaining portion of the nonaqueous liquid, and wherein the separated portions of the nonaqueous liquid obtained are recirculated.

14. The process of claim 1, wherein said first membrane comprises hollow filaments or tubes.

15. The process of claim 1, wherein said second membrane comprises hollow filaments or tubes.

16. The process of claim 1, wherein said first membrane is arranged vertically in the first transport zone, the nonaqueous liquid being conducted from top to bottom past the membrane surfaces and parallel thereto thereby receiving metal ions from said first aqueous liquid.

17. The process of claim 1, wherein said first membrane comprises a cellular pore system having cells and connecting pores between said cells.

18. The process of claim 1, wherein a pore volume of said first membrane is 65–85% of the total membrane volume.

19. The process of claim 18, wherein said pore volume is 70–80% of the total membrane volume.

20. The process of claim 1, wherein a wall thickness of said first membrane is about 50 to 400 µm.

21. The process of claim 20, wherein said wall thickness is about 50 to 300 µm.

22. The process of claim 1, wherein said first membrane is comprised of polypropylene.

23. The process of claim 1, wherein said first membrane is comprised of polyvinylidene fluoride.

24. The process of claim 1, wherein said second membrane is comprised of a microporous hydrophobic polymer.

25. The process of claim 24, wherein said second membrane comprises a cellular pore system having cells and connecting pores between said cells.

26. The process of claim 24, wherein the pore volume of said second membrane is 65–85% of the total membrane volume.

27. The process of claim 26, wherein the pore volume is 70–80% of the total membrane volume.

28. The process of claim 24, wherein the wall thickness of said second membrane is about 50 to 400 m.

29. The process of claim 28, wherein the wall thickness is about 50 to 300 µm.

30. The process of claim 24, wherein the microporous hydrophobic second membrane is comprised of polypropylene.

31. The process of claim 24, wherein the microporous hydrophobic second membrane is comprised of polyvinylidene fluoride.

32. The process of claim 24, wherein said second membrane comprises a microporous hydrophobic membrane having a hydrophilized inner surface.

33. The process of claim 1, wherein said second membrane is comprised of a hydrophilic material.

34. The process of claim 33, wherein the hydrophilic material is regenerated cellulose.

35. The process of claim 33, wherein the hydrophilic material is polysulfone.

36. The process of claim 33, wherein the hydrophilic material is an organic polymer to which ionic groups are bound.

37. The process of claim 36, wherein the organic polymer is polystyrene.

38. The process of claim 33, wherein the maximum diameter of pore passages on the outer surfaces and inside surfaces of the membrane is 100 nm.

* * * * *

UNITED STATES PATENT AND TRADEMARK OFFICE
CERTIFICATE OF CORRECTION

PATENT NO. : 4,822,491
DATED : April 18, 1989
INVENTOR(S) : Karl OSTERTAG

It is certified that error appears in the above-identified patent and that said Letters Patent is hereby corrected as shown below:

Column 3, line 10, change "well" to --will--.

Column 5, line 23, change "M" to --X--;
          line 44, change "a" to --A--.

Column 11, line 22, change "patch" to --path--;
           line 40, change "theeof" to --thereof--.

Column 12, line 18, change "farily" to --fairly--;
           line 33, change "ransport" to --transport--.

Column 14, line 35, change "liner" to --inner--.

Column 15, line 11, delete "separation";
           line 58, change "are" to --and--;
           line 61, change "for" to --from--.

Signed and Sealed this
Twenty-third Day of January, 1990

Attest:

JEFFREY M. SAMUELS

*Attesting Officer*    *Acting Commissioner of Patents and Trademarks*